Figure 1:
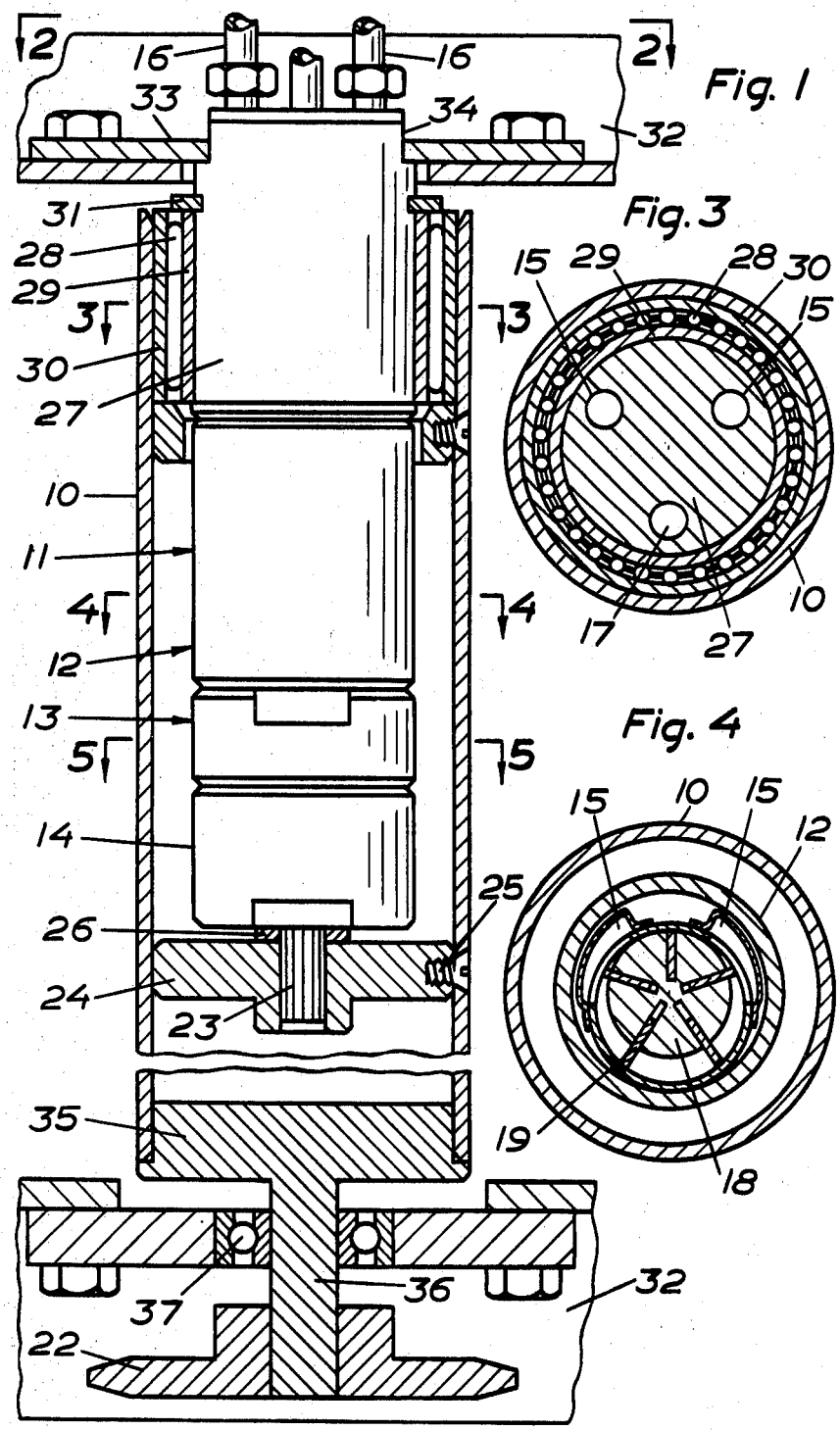

United States Patent

[11] 3,568,821

[72] Inventor Ernst Gunnar Gronkvist
 Stockholm, Sweden
[21] Appl. No. 785,163
[22] Filed Dec. 19, 1968
[45] Patented Mar. 9, 1971
[73] Assignee Atlas Copco Aktiebolag
 Nacka, Sweden
[32] Priority Dec. 29, 1967
[33] Sweden
[31] 18,082/67

[54] POWER-DRIVEN CONVEYOR ROLLER
 1 Claim, 6 Drawing Figs.
[52] U.S. Cl. .................................................. 198/127
[51] Int. Cl. ................................................. B65g 13/02
[50] Field of Search ........................................... 198/127,
 127 (E)

[56] References Cited
UNITED STATES PATENTS
1,881,267 10/1932 Drexler .................... 198/127(E)
3,222,954 12/1965 Wuertz .................... 198/127(E)

Primary Examiner—Evon C. Blunk
Assistant Examiner—Alfred N. Goodman
Attorney—Eric Y. Munson ABSTRACT: A conveyor roller of the type used in conveyor roller trains is provided. The conveyor roller includes a drum with an enclosed power unit. One end of the drum is journaled in a frame, the other end is journaled on the power unit which projects out from the drum and is fixedly mounted in the frame. A driving shaft of the power unit rotates the drum via a member inside the drum.

PATENTED MAR 9 1971 3,568,821
SHEET 2 OF 2
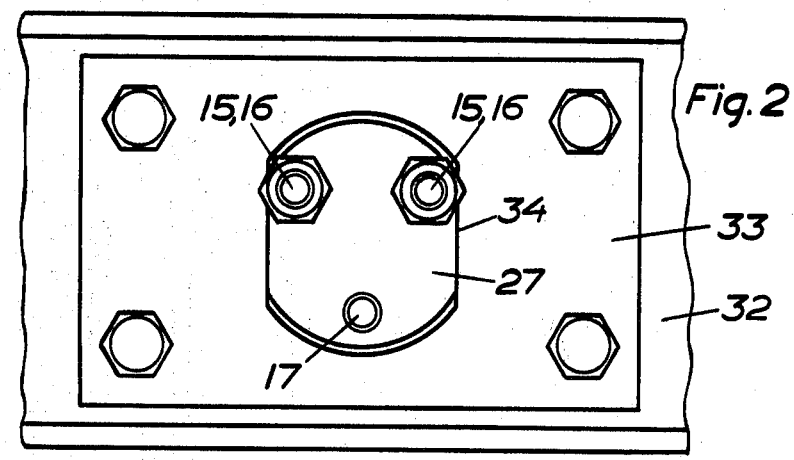
Fig. 2
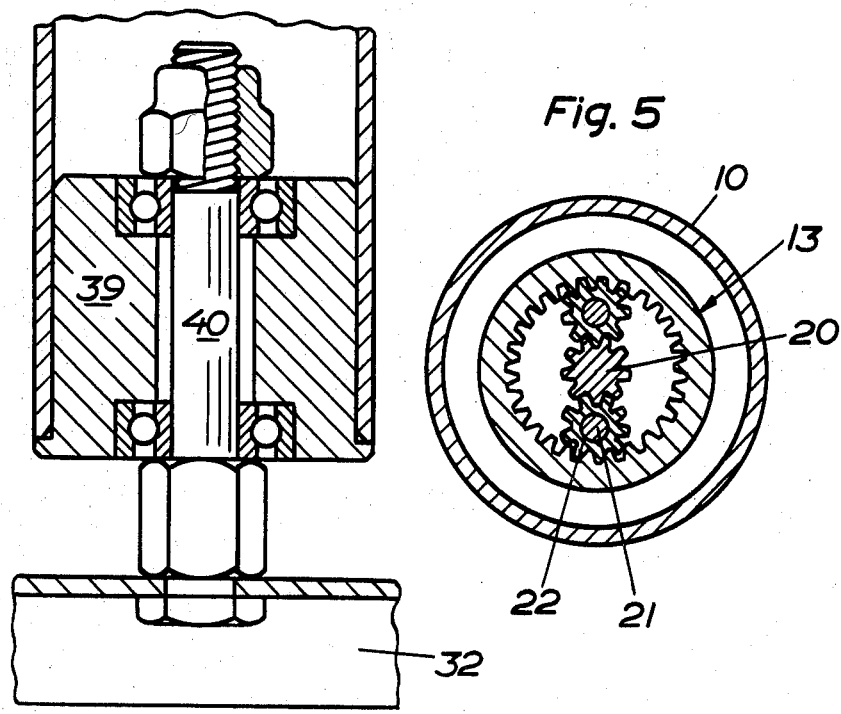
Fig. 6
Fig. 5
INVENTOR.
Ernst Gunnar Gronkvist
BY
Attorney

POWER-DRIVEN CONVEYOR ROLLER

This invention relates to power-driven conveyor rollers of the type provided with motor and gearing enclosed within a drum. In plants, where trains of conveyor rollers are used, a great number of conveyor rollers is sometimes used, which are of various torque and rotation speed. In connection with previous embodiments of such conveyor rollers it has not been possible to change the torque and the rate of rotation easily. Moreover, only skilled people are able to repair such a conveyor roller.

It is therefore an object of the invention to permit easy and fast withdrawing and substitution of the parts of a conveyor roller of the above-stated type which parts are subjected to wear, i.e. the motor and the gearing. Another object is to provide conveyor rollers of this type, having various torque and rates of revolution by using a few components.

The above and other objects of the invention will become obvious from the following description and from the accompanying drawings in which a preferred embodiment of the invention is illustrated by way of example. It should be understood that the embodiment is only illustrative of the invention and that various modifications thereof may be made within the scope of the claims.

In the drawings,

FIG. 1 shows a horizontal longitudinal section of the conveyor roller mounted in a frame;

FIG. 2—5 shows sections on the lines 2–2, 3–3, 4–4 and 5–5 in FIG. 1; and

FIG. 6 shows another form of some details of the conveyor roller shown in FIG. 1.

The conveyor roller shown in the FIGS. consists of a power unit 11 enclosed within an elongated drum 10. The power unit 11 consists of a motor 12, the casing of which is united with the casings of two planetary gear units 13, 14. The motor 12 is a pressure fluid driven sliding vane motor, preferably an air motor, which has two alternative inlets 15 with supply conduits 16 and a centrally placed outlet 17, one of the inlets 15 being used to effect rotation in one direction and the other being used to effect rotation in the opposite direction. The motor 12 includes a rotor 18 and sliding vanes 19. By a splined connection (not shown) the rotor 18 rotates the sun gear 20 of the planetary gear unit 13. The planet carrier 21 of this planetary gear unit, which carrier carries planet gears 22, is fastened to a driving shaft (not shown) extending from the planetary gear unit 13. In turn, this shaft drives the sun gear (not shown) of the gear unit 14. A driving shaft 23 of the gear unit 14 drives a member 24, which member is affixed to the drum 10 by screws 25. Between the member 24 and the gear unit 14 is a spacer 26 arranged so as to permit a precise fitting of the drive unit 11. The drum 10 is journaled on a back end 27 of the motor by a roller bearing 28, 29, 30 of the needle-bearing type. When the power unit 11 is withdrawn from the drum 10, the entire bearing, i.e. the inner race 29, the needles 28 with the needle cage and the outer race 30, or at least the inner race 29, goes with the power unit 11. A part of the back end 27 projecting out from the drum is fixedly mounted in a frame 32 by means of a plate 33, which plate interacts with recesses 34 on the back 27 and thus prevents rotation of the power unit 11. This plate 33 is screwed to the frame 32.

An end part 35 with a stub shaft 36 is secured to the drum at the end of the drum which is remote from the power unit 11. By bearings 37, this stub shaft 36 is rotatably journaled in the frame 32. In order to permit chain drive of one or several conveyor rollers having no motor enclosed, a sprocket 22 is provided on the shaft 20.

FIG. 6 shows another way of mounting in the frame the drum end which is remote from the power unit 11. A bushing 39 is rotatively journaled to a trunnion 40 which is fixedly mounted in the frame 32. In this form the conveyor roller is not arranged to drive motorless conveyor rollers.

From the above description it is apparent that the entire power unit 11 may be withdrawn from the drum 10 without using any tool. The power unit itself consists of separate and replaceable units which are united by their casings; the units being the motor unit 12 with its detachable back end 27 and the planetary gear units 13, 14.

When a substantial change of the rotation ratio is needed, one of the planetary gear units 13, 14 may be substituted for a planetary gear unit of different transmission ratio. Fast-running rollers require one gear unit only, while more than two gear units may be required for very slow running rollers. The member 24 may easily be adjusted to fit various gear unit combinations because it is held by the screws 25 only.

Conveniently, the two inlets 15 of the motor are provided with variable restrictions, so as to permit some adjustment of the maximum speed by means of the restrictions. The maximum torque will then be changed only a little.

The conveyor roller above described and illustrated in the drawings should only be considered as an example and may be modified in different ways within the scope of the claims.

I claim:

1. A power-driven conveyor roller carried by a frame and comprising an elongated drum rotatably journaled with a first end in said frame, a power unit, said power unit having a cylindrical housing, said housing being disposed within said drum and nonrotatably mounted in the frame with an end portion affixed to said frame and which end portion protrudes from the drum, a second end of the drum being rotatably journaled on the cylindrical housing of the power unit, a driving member disposed in the drum at a distance from the drum ends and affixed to the drum, and a driving shaft of the power unit connected to the driving member for rotating the drum, said power unit comprising a pressure fluid-actuated motor and a planetary gear unit which have separate cylindrical housings, said housings being united so as to form the housing of the power unit.